US005867648A

United States Patent [19]
Foth et al.

[11] Patent Number: 5,867,648
[45] Date of Patent: Feb. 2, 1999

[54] HIGH SPEED HETEROGENEOUS COUPLING OF COMPUTER SYSTEMS USING CHANNEL-TO-CHANNEL PROTOCOL

[75] Inventors: Thomas J. Foth, Trumbull; Neil J. Unger, Newtown, both of Conn.

[73] Assignee: General Signal Corporation, New York, N.Y.

[21] Appl. No.: 729,231

[22] Filed: Oct. 9, 1996

[51] Int. Cl.⁶ .................................................. G06F 15/16
[52] U.S. Cl. .................................... 395/200.6; 395/200.47
[58] Field of Search ............................ 395/200.33, 200.6, 395/200.76, 886, 200.47

[56] References Cited

U.S. PATENT DOCUMENTS

| | | | |
|---|---|---|---|
| 4,748,617 | 5/1988 | Drewlo | 370/85 |
| 5,297,277 | 3/1994 | Dein et al. | 395/575 |
| 5,388,060 | 2/1995 | Adams, Jr. et al. | 364/579 |
| 5,403,639 | 4/1995 | Belsan et al. | 395/600 |
| 5,493,724 | 2/1996 | Cohn et al. | 395/858 |
| 5,559,972 | 9/1996 | Carey et al. | 395/281 |
| 5,630,092 | 5/1997 | Carreiro et al. | 395/438 |
| 5,640,541 | 6/1997 | Bartram et al. | 395/500 |

OTHER PUBLICATIONS

Bus–Tech, Inc., Interactive Guide for LAN to Mainframe Integration (1996).
Polaris Model 6800 PCI ESCON Channel Interface Spec Sheet, Polaris Communications Inc. Jun. 1996, pp. 1–2.
Polaris Model 6900 PCI ESCON Channel Interface Spec Sheet, Polaris Communications Inc. Jan. 1996, pp. 1–2.

*Primary Examiner*—Mehmet B. Geckil
*Attorney, Agent, or Firm*—Ratner & Prestia

[57] ABSTRACT

There is provided a connectivity scheme for heterogeneously coupling computer systems of dissimilar architectures, such as a client/server system to a mainframe system, using a high speed, low overhead protocol. The connection uses a channel-to-channel protocol, such as a Bus and Tag connection or ESC on connection. The scheme allows mainframe systems, particularly non-IBM and non-IBM plug compatible mainframes, to communicate with each other and with IBM and IBM plug compatible mainframes over the same high speed interfaces using large block sizes. Thus, the scheme provides non-IBM and non-IBM plug compatible mainframes to appear as peers in a channel-to-channel network.

7 Claims, 12 Drawing Sheets

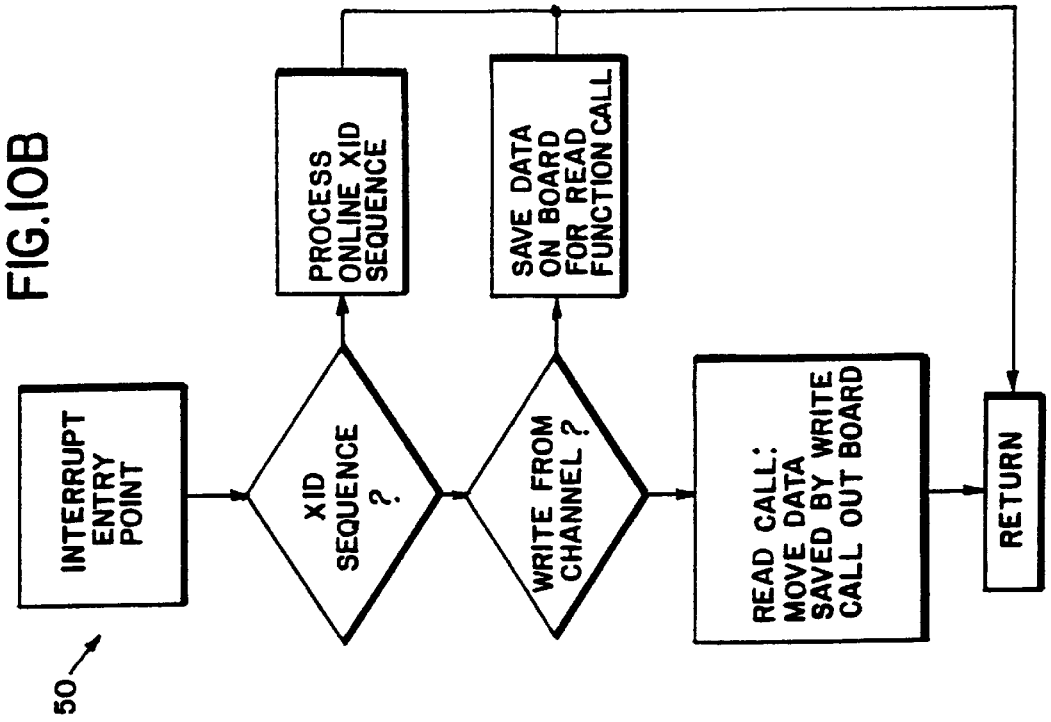
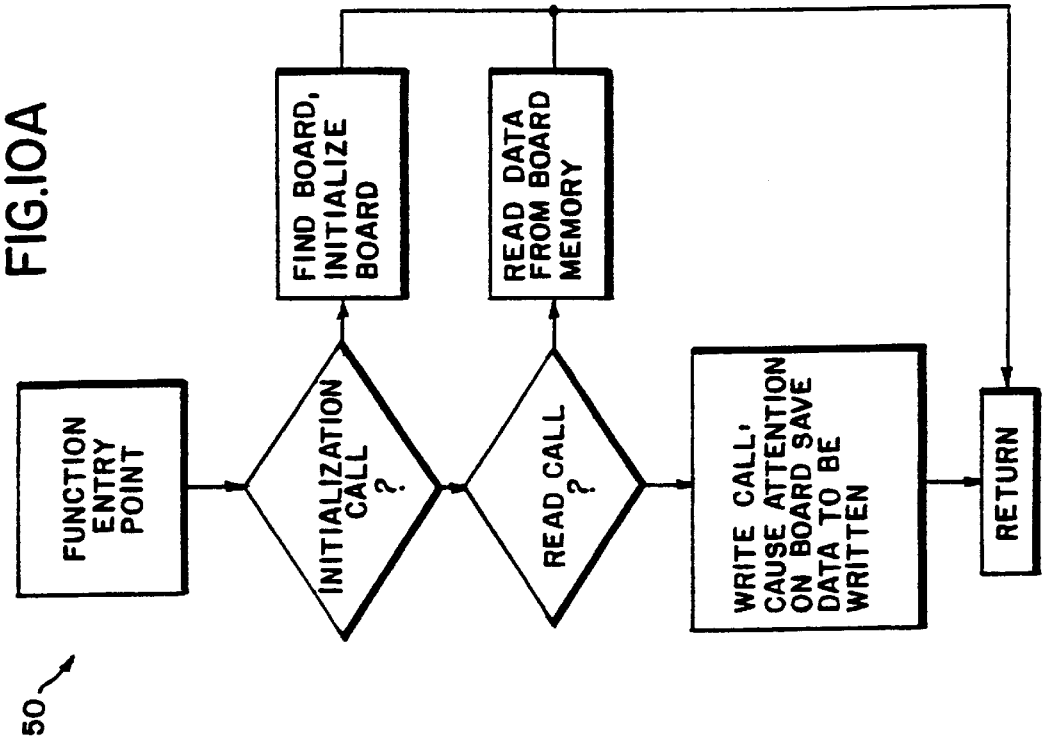

HIGH SPEED HETEROGENEOUS COUPLING OF COMPUTER SYSTEMS USING CHANNEL-TO-CHANNEL PROTOCOL

The present invention relates generally to schemes for coupling computer systems of dissimilar architectures. More particularly, the present invention relates to a connectivity scheme for coupling a client/server system to a mainframe system using a high speed, low overhead protocol, such as a channel-to-channel protocol.

BACKGROUND OF THE INVENTION

Client/serve systems, such as off-load servers, are often used in large scale computing environments. Customers for these systems, such as banks and credit card issuers, need high speed connectivity between their servers and mainframe systems to provide quality service and maximize their investment in information management. Applications that require such high speed connectivity include transaction co-processing, massive file transfers for decision support, archival databases for disaster recovery and transaction reporting requirements.

Non-IBM Plug Compatible Mainframe ("POM") systems need high speed inter connectivity to IBM PCM systems. Traditionally, this connectivity has been accomplished via data communications circuits and/or LAN connectivity that both systems share in common. However, customers have been demanding higher bandwidth connectivity. Unfortunately, data communications circuits and/or LANs share the deficiencies of relatively slow data rates, small blocksizes (which incur additional overhead too because of the larger number of blocks required to transmit the date), and the store and forward of data through network elements. Currently, to increase bandwidth, customers add additional circuits and the associated hardware and, in most cases, additional hardware is expensive front end processors ("FEPs"). Additionally, customers have legacy applications formed around this connectivity.

For conventional systems, the interactive interface between the server system and the mainframe system is restricted to homogeneous clusters of mainframe or mainframe plug compatible computers, particularly for IBM mainframe computers. IBM does provide channel-to-channel connectivity using TCP/IP to their series RS/6000 systems and Synchronous Network Architecture (SNA) to their series AS4. However, these systems do not provide for heterogeneous coupling of server systems from other vendors to mainframe systems.

The industry standard Small Computer System Interface (SCSI) has been used by conventional connectivity schemes to connect server systems to mainframe systems so that data may be transferred therebetween. Such connectivity schemes connect an input/output channel of a mainframe system to a SCSI interface of a server system. Thus, the industry standard SCSI interface provides for heterogeneous, physical coupling of server systems to mainframe systems. For example, the Data Blaster by Bus-Tech Inc. of Burlington, Mass., connects an IBM, IBM compatible and Unisys 2000 mainframe system to the SCSI interface of a server system and utilizes a simplistic virtual tape protocol to move data between the systems. During operation, the mainframe reads and writes to the Data Blaster as if it were a 3420 tape, and the server system reads and writes to the Data Blaster as if it were a standard SCSI attached tape.

However, the above conventional connectivity scheme does not operate in a network of computer systems. In addition, this conventional connectivity scheme uses the virtual tape protocol and does not interoperate with standard networking software. The above-noted Data Blaster emulates a standard tape controller on each side of the connection, and data is transferred using standard tape drive commands. Thus, the bulk data transfer is unidirectional and, thus, data can only be transferred in one direction at a time. Therefore, the above connectivity schemes merely permit file transfers and do not provide interactive operation between the server system and the mainframe system.

Against the foregoing background, it is a primary object of the present invention to provide a connectivity scheme that provides mainframe systems, particularly non-IBM and non-IBM plug compatible systems, with the virtual appearance of being a peer, vis-a-vis IBM systems, in a channel-to-channel network.

It is another object of the present invention to provide such a connectivity scheme that permits mainframe systems to communicate over high speed interfaces using large block sizes for a channel-to-channel network.

It is a further object of the present invention to provide such a connectivity scheme that allows mainframe systems to communication with each other using a standard interoperable protocol, such as the channel-to-channel protocol that is commonly used by IBM and IBM plug compatible mainframe systems.

It is also an object of the present invention to provide such a connectivity scheme to non-IBM and IBMPCMs via a standard widely adopted interfaces such as Server Net, SCSI, PCI, ISA, Fibre Channel, ATM, EISA, and MCA, VME, S-BUS.

SUMMARY OF THE INVENTION

The present invention works with any system that supports a wide variety of industry standard interfaces, such as a SCSI interface. The present invention is a connectivity scheme that capitalizes on the low overhead and high performance of IBM's channel-to-channel protocol to couple systems of dissimilar architectures. In particular, the scheme takes advantage of the ability of the channel-to-channel protocol to move large blocks of data over high speed parallel or fiber optic interfaces. Therefore, the scheme provides universal connectivity and high speed access to key information for many applications.

To accomplish the foregoing objects and advantages, the present invention is a scheme for enabling coupling of computer systems having dissimilar architectures. The scheme, in brief summary, comprises first and second computer systems of dissimilar architecture in which data is transmitted therebetween over a high-speed path using channel-to-channel protocol, and the first computer system includes an interface adapter. The scheme also includes means disposed in the path between the first and second computer systems and coupled to the interface adapter of the first system for redirecting the input/output operation of the interface adapter of the first computer system, such that the first system appears to have the same architecture as the second system.

More particularly, the present invention is a computer control device for enabling coupling of first and second computer systems of dissimilar architecture, the device comprising means adapted to be coupled to the host adapter of the first computer system for re-directing the input/output operation of the host adapter of the first computer system using channel-to-channel protocol, such that the first computer system appears to have the same architecture as the second computer system.

BRIEF DESCRIPTION OF THE DRAWINGS

The foregoing and still further objects and advantages of the present invention will be more apparent from the following detailed explanation of the preferred embodiments of the invention in connection with the accompanying drawings:

FIGS. 10A and 10B are flow charts which illustrate the PCI device driver (program means); and, effectively, the operational steps directed by or resulting from the program means;

DETAILED DESCRIPTION OF THE PREFERRED EMBODIMENT

Before proceeding with the description, it is well to consider the following definitions of terms that will be used:

channel. A functional unit, controlled by the processor, that handles the transfer of data between processor storage and local peripheral equipment. See input/output channel.

input/output channel. (1) In a data processing system, a functional unit that handles transfer of data between internal and peripheral equipment. (1) (A) (2) In a computing system, a functional unit, controlled by a processor, that handles transfer of data between processor storage and local peripheral devices. In data processing terminology, a channel, that is, an I/O channel or data channel, provides two-way transfers, or moves, of data between processor storage and peripheral devices.

channel-to-channel adapter. A hardware device that can be used to connect two channels on the same computing system or on different systems.

channel-to-channel protocol. A series of input/output instructions that are executed by the processor to cause data to transfer from the local storage of one processor to the local storage of another processor by way of a channel-to-channel adapter.

By the term "heterogeneous coupling" is meant coupling on a universal basis of at least two computer systems—despite their having dissimilar architectures, and regardless of whether they are made by a single manufacturer or multiple manufacturers. The term does not embrace coupling of systems of dissimilar architecture where the systems are both made by the same manufacturer, or where non-generic coupling may be achieved for specific applications.

By the term "universal converter" is meant the converter of the present invention—which can enable, because of its hardware configuration and its controlling software, the objective of herterogeneously coupling computer systems of dissimilar architecture.

The present invention is a connectivity schemes for coupling computer systems of dissimilar architectures, such as a client/server system to a mainframe system, using a high speed, lower overhead protocol. The connection is either a Bus and Tag connection or ESCON connection. More particularly, the present invention allows mainframe systems, particularly non-IBM and non-IBM plug compatible mainframes, to communicate with each other and with IBM and IBM plug compatible mainframes over these high speed interfaces and connections (Bus and Tag or ESCON) using large block sizes. Thus, the present invention provides non-IBM and non-IBM plug compatible mainframes to appear as peers in a channel-to-channel network and in a symmetric peer-to-peer relationship.

Figure 1:
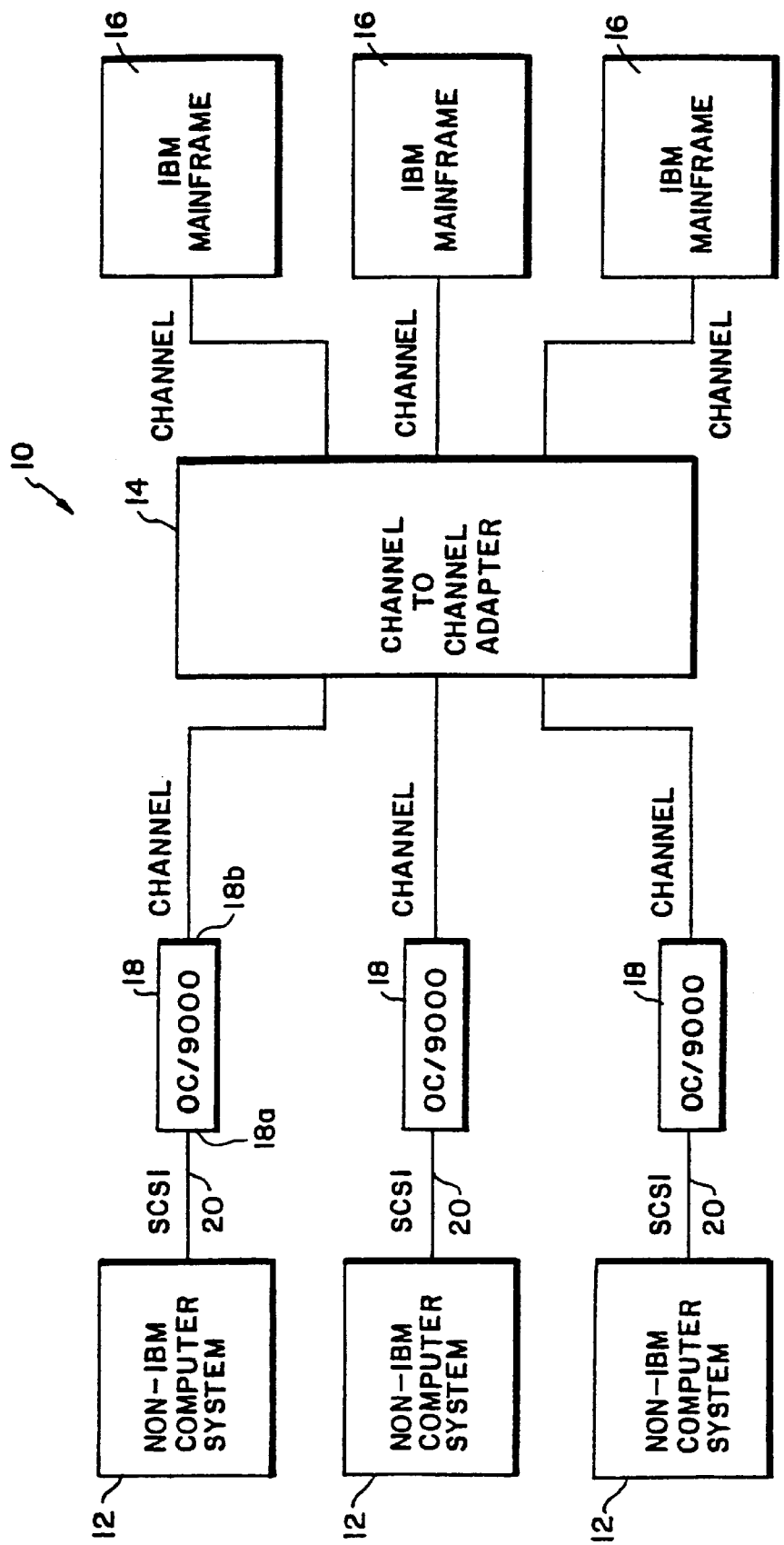
FIG. 1 is a block diagram of the first preferred embodiment in accordance with the present invention.

Referring to the drawings and, in particular, to FIG. 1, there is provided a connectivity scheme of the preferred embodiment which is generally represented by reference numeral 10. The connectivity scheme 10 is a system having a plurality of non-IBM or non-IBM plug compatible computer systems 12 interconnected by a channel-to-channel adapter 14 to a plurality of IBM or IBM plug compatible mainframe systems 16. The channel-to-channel adapter 14 provides for interoperative communication between the systems 12, 16 and is not limited to simple file transfers. In addition, the non-IBM and non-IBM plug compatible computer systems 12 are connected to the channel-to-channel adapter 14 by a hardware converter 18, such as the OC/9000 shown in FIG. 1. The non-IBM and non-IBM plug compatible computer systems 12 are connected to the hardware converter 18 by a Small Computer System Interface ("SCSI") line 20 which is an industry standard.

Figure 2:
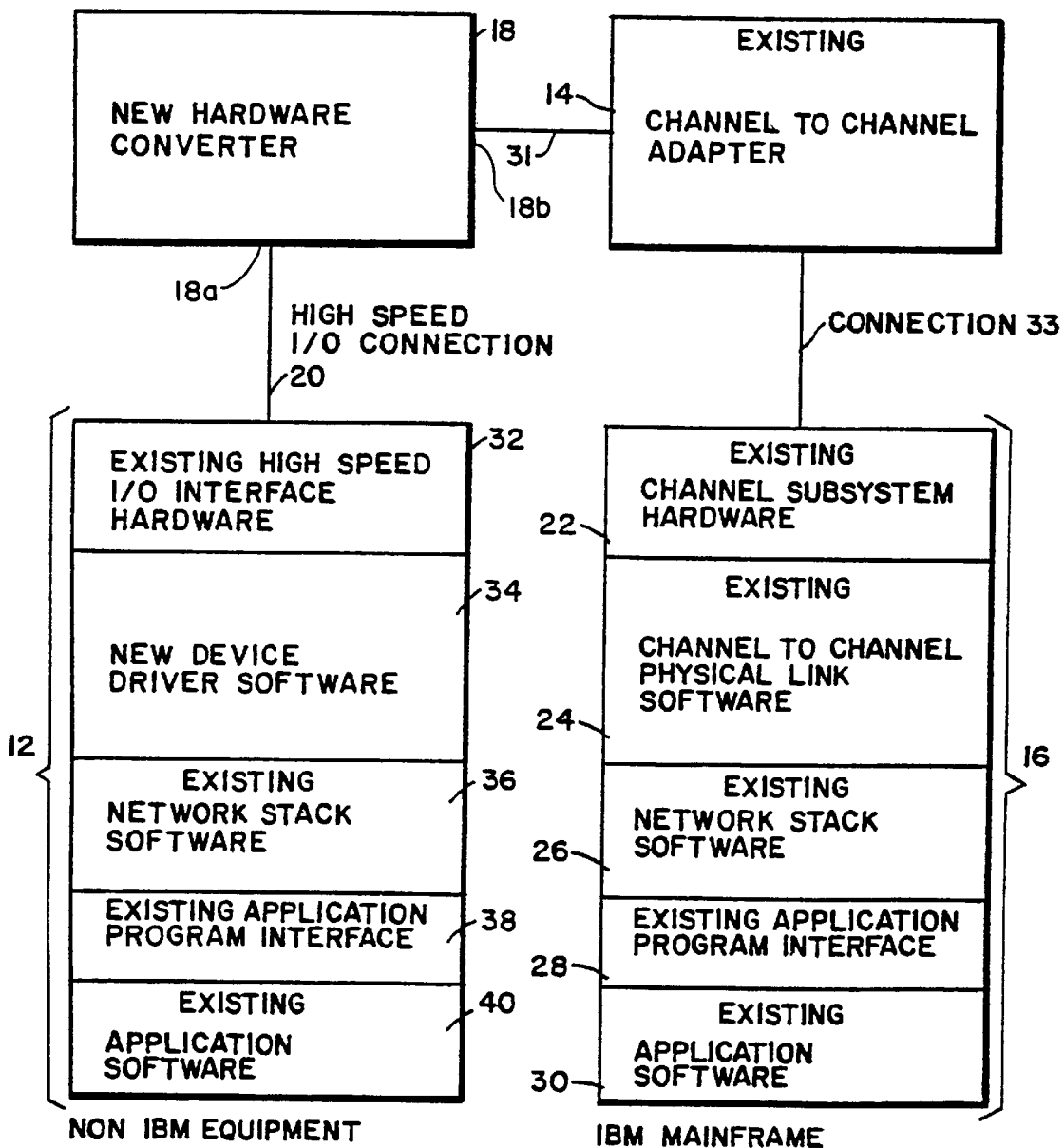
FIG. 2 is a block diagram of the first preferred embodiment of FIG. 1 in which the inner components of the Non-IBM Equipment and IBM Mainframe are shown in detail.

Referring to FIG. 2, the connectivity scheme 10 of the present invention is shown in greater detail with respect to each one of the coupled pairs of systems shown in FIG. 1. In particular, the IBM or IBM plug compatible mainframe systems 16 includes previously existing components, i.e. channel subsystem hardware 22, channel-to-channel physical link software 24, network stack software 26, application program interface 28 and application software 30. For the first preferred embodiment, the channel subsystem hardware 22 is a Bus and Tag type, and the network stack software 26 is implemented for using TCP/IP or VTAM. In addition, the channel-to-channel adapter 14 is a Bus and Tag type, such as the Data Switch 9088 and IBM 3088. The network software stack 26 and application software 30 on the IBM or IBM plug compatible mainframe system is unaffected inasmuch as the non-IBM or non-IBM plug compatible mainframe system appears as an IBM or IBM plug compatible mainframe system.

Referring now to the left portion of FIG. 2, the connectivity scheme 10 also includes the a high speed input/output interface hardware 32, non-IBM equipment having previously existing components, i.e. network stack software 36, application program interface 38 and application software 40 that are connected by line 20 to the newly added, in accordance with the invention, hardware converter 18 via SCSI line 20. Also, newly added to the non-IBM equipment is device driver software 34, which replaces the existing drivers of conventional systems.

The hardware converter 18 converts input/output connections, such as SCSI, ATM, Fiber Channel, ServerNet, Ethernet and Token Ring to Bus and Tag or ESCON type connections, and optionally stimulates channels configured for channel-to-channel operation. The application software 40 in non-IBM or non-IBM plug compatible mainframe computers execute functions in the network software stack 36. The device driver software 34 redirects the input/output operation over the computer systems existing input/output interface hardware 32, which may be a SCSI Host Adapter, Asynchronous Transfer Mode ("ATM"), Fiber Channel or SeverNet network interface adapter. Accordingly, commands from the device driver software 34 cause the hardware converter 18 to act as if, in place of the non-IBM equipment 12, there were an IBM or IBM plug compatible mainframe to be connected by means of the channel-to-channel adapter 14 to the IBM mainframe 16.

For the first preferred embodiment, the new hardware converter 18 is connected to the input/output interface hardware 32 through an interface 18a by the SCSI line 20, which may be a SCSI, ATM Fiber Channel, ServerNet et al connection; and a Bus and Tag or ESCON connection 31 is made between the hardware converter 18 and the channel-to-channel adapter 14 through an interface 18b and a connection 33 between the channel-to-channel adapter 14 and the channel subsystem hardware 22 interfaces 18a and 18b are illustrated in both FIGS. 1 and 2 for convenience. Also, the high speed input/output interface hardware 32 uses the protocol for SCSI, ATM, Fiber Channel, ServerNet et al, and the network stack software 36 uses the protocol for TCP/IP or SNA.

Figure 3:
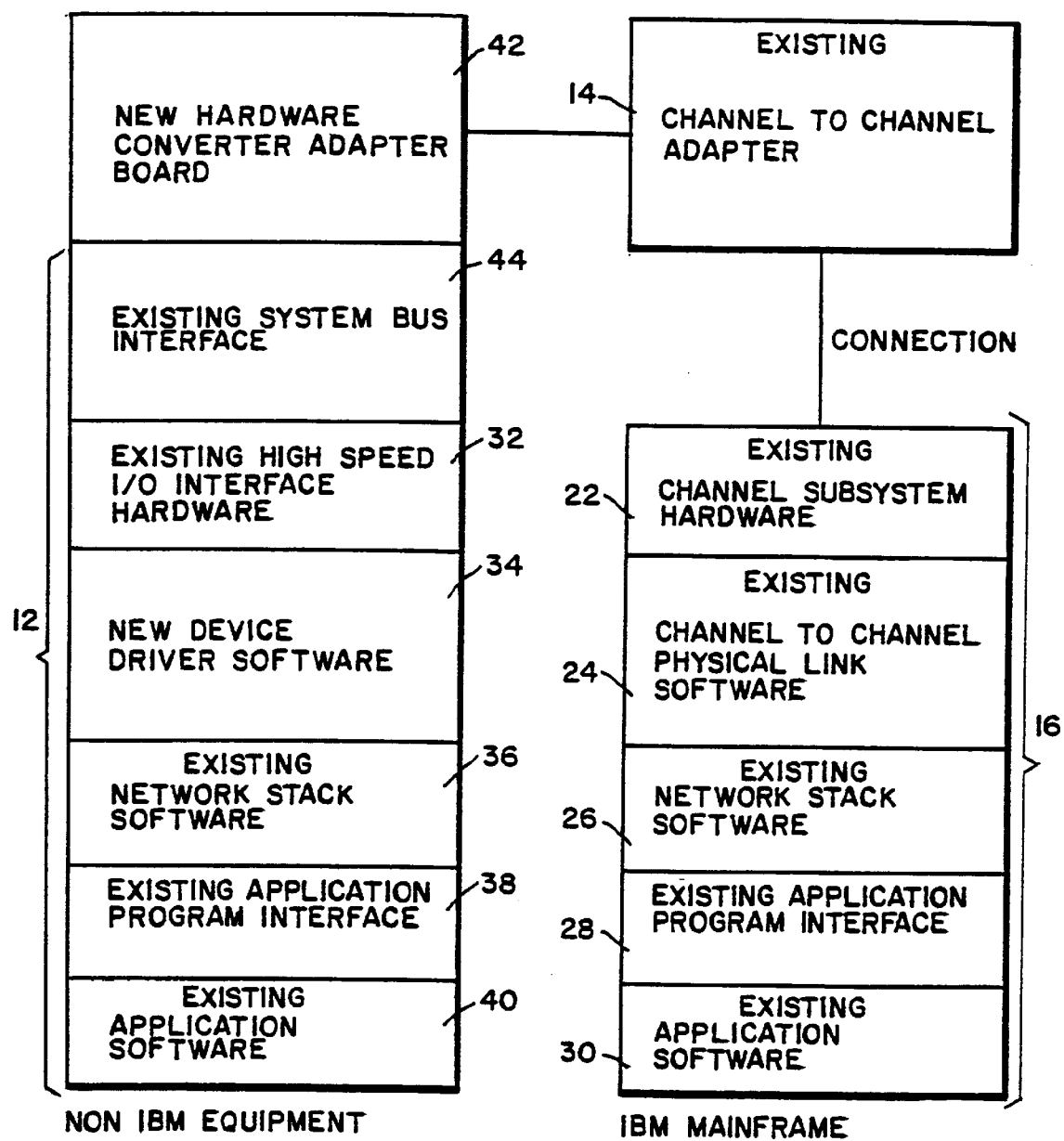
FIG. 3 is block diagram of a second preferred embodiment in accordance with the present invention it which the inner components of the Non-IBM Equipment and IBM Mainframe are shown in detail.

Referring to FIG. 3, the second preferred embodiment is substantially similar to the first preferred embodiment shown in FIG. 2. The primary difference between these two embodiments is that the second preferred embodiment includes a hardware converter adapter board 42 that connects to an existing industry standard system bus interface 44 of the non-IBM or non-IBM plug compatible computer system 12. Examples of standards used to connect the hardware converter adapter board 42 to the system bus interface 44 include common standards such as ISA, VME, PCI, S-Bus, MCA, EISA as well as other standards.

Figure 4A:
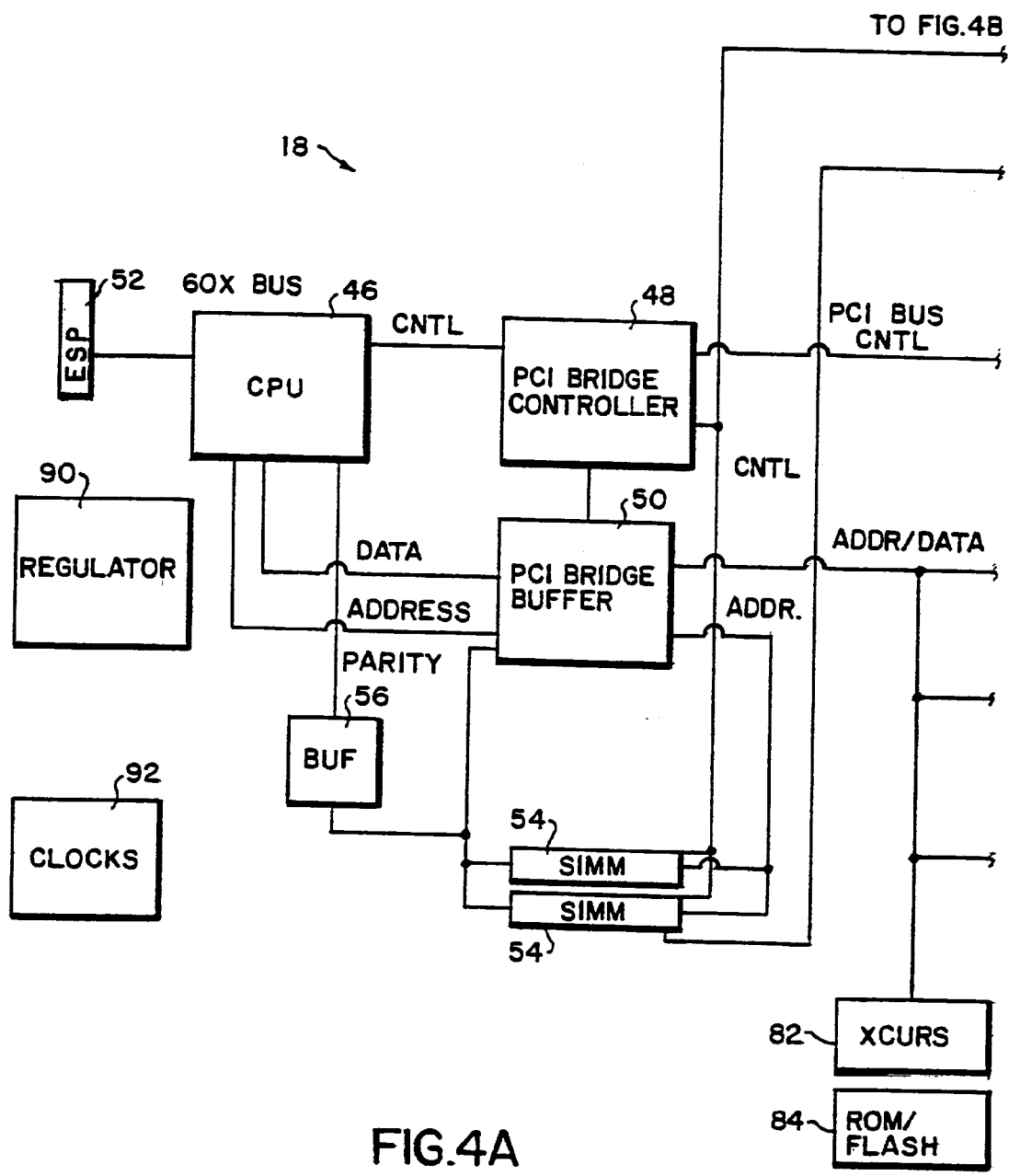
FIG. 4 is a schematic diagram of the hardware converter of FIG. 2; being subdivided into FIGS. 4A and 4B.
Figure 4B:
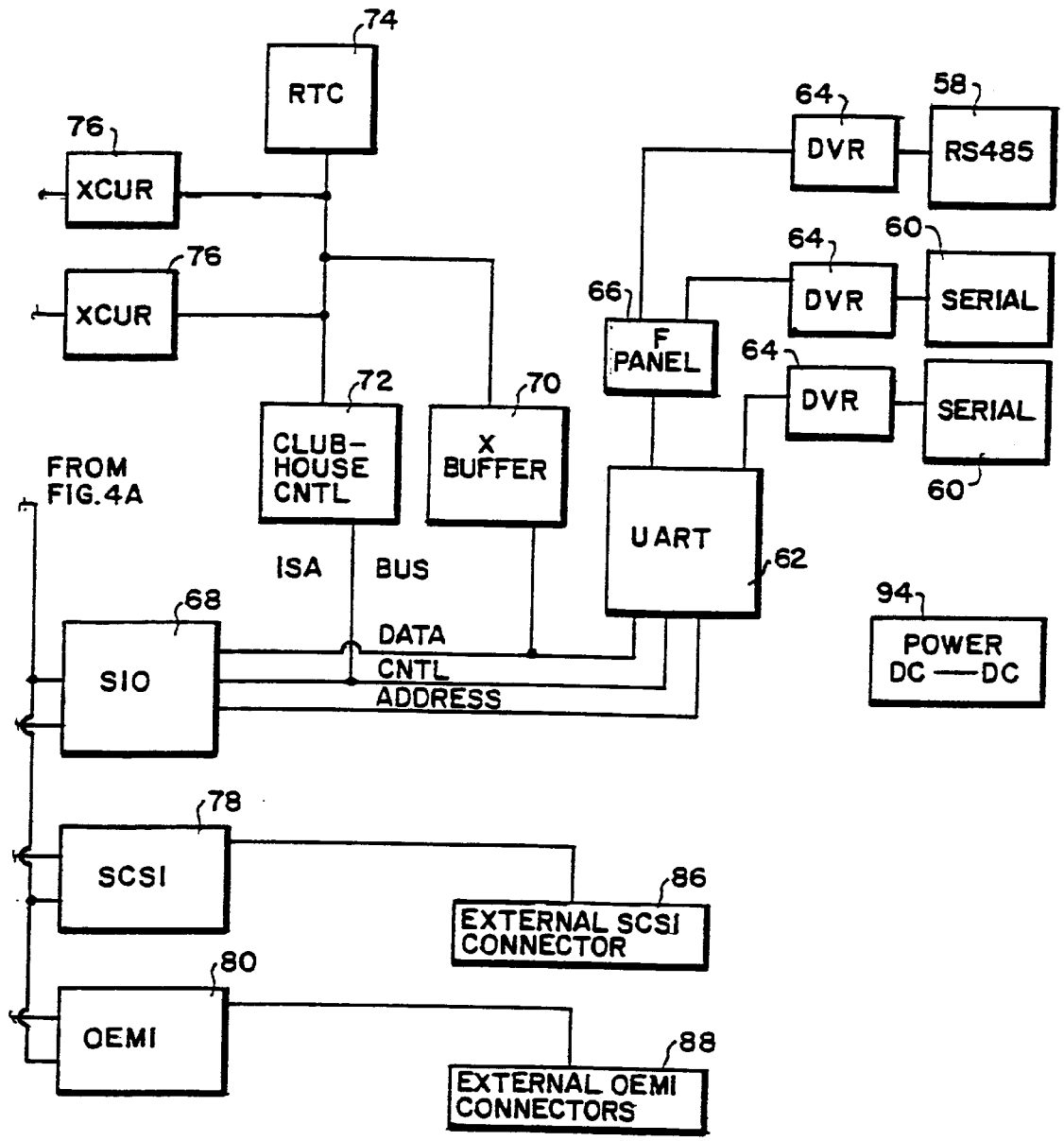

Referring to FIG. 4, there is provided the specific hardware configuration of the first preferred embodiment shown in FIG. 2; in particular, FIG. 4 is a schematic diagram of the hardware converter 18 shown in block form in FIG. 2. This hardware configuration includes a CPU 46 that sends output control signals to a Peripheral Component Interconnect (PCI) bridge controller 48 and data and address signals to a PCI bridge buffer 50 and receives input signals from ESP 52 for diagnostic purposes only. Also, one or more single inline memory modules ("SIMMs") 54 are connected to an input of PCI bridge buffer 50, and a buffer 56 is connected between the SIMMs 54 and the CPU 46. At the other side of the configuration, an RS485 connection 58 is made to a backplane, and a pair of serial connections 60 are made to a front panel. These connections 58, 60 are connected to Universal Asynchronous Receiver-Transmitter (UART) circuit 62 via driver/receiver circuits 64 and front panel PAL 66. The UART circuit 62, in turn, is connected to a SIO circuit 68 by a data line, control line and address line. The data line and control line are connected to the SIMMs 54 through Xbuffer 70, clubhouse control 72, RTC 74 and XCVR's 76.

The PCI bridge controller 48 and PCI bridge buffer 50 are connected to the SIO circuit 68 as well as a SCSI interface circuit 78 and an OEMI interface circuit 80. Specifically, control lines connect the PCI bridge controller 48 to the SIO circuit 68, SCSI interface circuit 78 (shown as interface 18a in FIGS. 1 and 2) and OEMI interface circuit 80 (shown as interface 18b in FIGS. 1 and 2), and an address/data line connects the PCI bridge buffer 50 to these circuits. The PCI bridge buffer 50 is also connected to a XCVR's circuit 82, and a ROM/flash circuit 84. The SCSI circuit 78 and the OEMI circuit 80 are coupled to external connectors 86, 88 for the SCSI and OEMI outputs, respectively, to line 20 of FIG. 2. The hardware configuration further includes a voltage regulator 90, a clock circuit 92 and a DC-DC power converter 94.

OPERATION OF COUPLING SCHEME

Operation of the hardware converter of FIG. 4, which is part of the first embodiment of the present invention, will now be described; reference herein will be made when appropriate to the flow charts of FIGS. 6–10.

Principally, there are three primary devices on the PCI bus presented by CNTL and ADDR/DATA lines leaving PCI Bridge Controller 48 and PCI Bridge Buffer 50: the SIO 68, the SCSI, 78, and the OEMI, 80. The purpose of the SIO 68 circuitry is to provide connections for the following functions to the CPU:

remote command and control through either a backplane connection (62, 66, 64, and 58) or a front panel connection (60, 64, and 66).

remote diagnostics through (60, 64, and 62).

real time clock signals 74.

front panel indicators and controls 66.

board status indicators 72.

The primary function of the converter 18 is to translate data signals arriving at the SCSDI connector 86 to signals departing from the OEMI connector 88 and vice versa. For signals arriving at the SCSI connector, this is accomplished as follows:

1. The SCSI interface 78 detects a SCSI command and generates an interrupt (See block 200 in FIG. 6) along the CNTL lines to the CPU 46 via the PCI Bridge Controller 48, and places the command data in system memory 54 through direct memory access under the supervision of the PCI Bridge Controller 48.

2. If the command is not acceptable, the program running in the CPU 46 notifies the SCSI interface 78 by placing information in system memory 54 and executing output instructions to the SCSI interface 78 via the CNTL ADDR/DATA lines through the PCI Bridge Controller 48 and the PCI Bridge Buffer 50.

3. If the command is acceptable, and is a write operation:
   3.1. The program running in the CPU 46 notifies the SCSI interface 78 by placing information in system memory 54 and executing output instructions to the SCSI interface 78 via the CNTL ADDR/DATA lines through the PCI Bridge Controller 48 and the PCI Bridge Buffer 50.

3.2. The program running in the CPU 46 instructs the OEMI interface 80 to get ready to write data to the Bus and Tag channel via connector 88. (See block 250 in FIG. 7).

3.3. The program running in the CPU 46 instructs the SCSI interface 78 to start reading data from the SCSI interface 78. (See block 252 in FIG. 7).

3.4. Initial status is captured by the OEMI interface 80.

3.5. The SCSI interface 78 causes data to flow from the external SCSI bus connected to rough connection 86 through the SCSI interface 78 directly to the OEMI interface 80 via a direct memory access operation along the PCI bus (CNTL and ADDR/DATA lines under the supervision of the PCI Bridge Controller 48 and PCI Bridge Buffer 50. The OEMI interface restructures the data into signals appropriate for Bus and Tag channels and these signals flow off the board through connector 88.

3.6. Ending status is captured by the OEMI interface 80.

4. If the command is acceptable, and is a read operation:

4.1. The program running in the CPU 46 notifies the SCSI interface 78 by placing information in system memory 54 and executing output instructions to the SCSI interface 78 via the CNTL ADDR/DATA lines through the PCI Bridge Controller 48 and the PCI Bridge Buffer 50.

4.2. The program running in the CPU 46 instructs the OEMI interface 80 to read data from the Bus and Tag channel via connector 88. (See 254 in FIG. 7).

4.3. The program running in the CPU 46 instructs the SCSI interface 78 to start writing data from the SCSI interface 78. (See 256 in FIG. 7).

4.4. Initial status is captured by the OEMI interface 80.

4.5. The SCSI interface 78 causes data to flow from the external OEMI bus connected through connection 88 through the OEMI interface 80 directly to the SCSI interface 78 via a direct memory access operation along the PCI bus (CNTL and ADDR/DATA lines under the supervision of the PCI Bridge Controller 48 and PCI Bridge Buffer 50). The SCSI interface restructures the data into signals appropriate for a SCSI bus and these signals flow off the board through connector 86.

4.6. At the end of transfer, the program notifies the SCSI interface 78 to terminate the transfer. (See block 258 in FIG. 7). This is necessary because the OEMI interface 80 may return less data that was requested in the SCSI command.

4.7. Ending status is captured by the OEMI interface 80.

5. Other commands (that are not read or write commands) may arrive at the SCSI interface 78 that allows the system connected to the SCSI 78 to configure the operation of the device and/or cause the OEMI interface 80 to present certain signals on the Bus and Tag channel to reset the connected channel-to-channel adapter.

Figure 9:
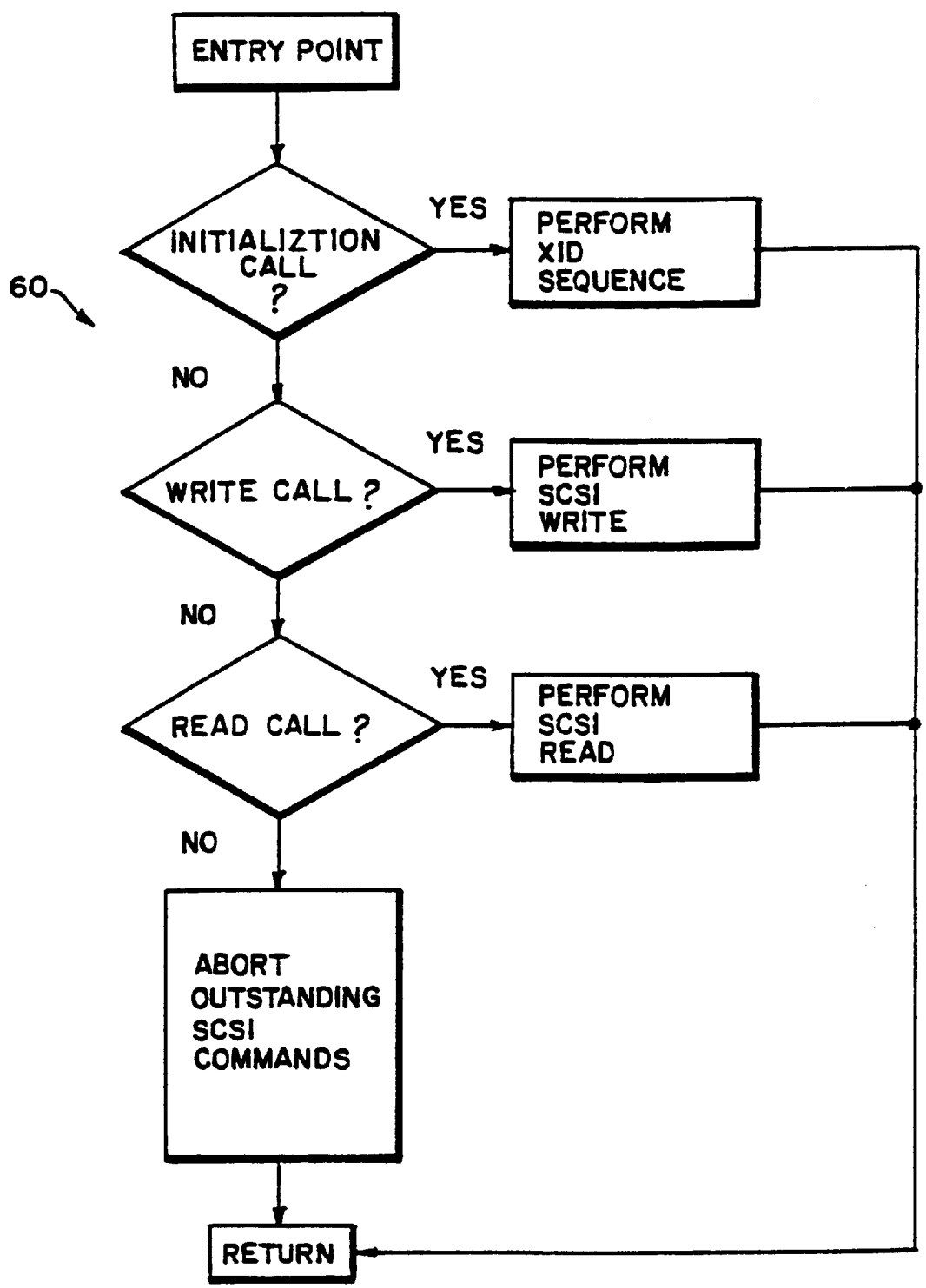
FIG. 9 is a flow chart or diagram which illustrates the SCSI device driver (program means); and effectively the operational steps directed by or resulting from the program means.

The device driver (software) in FIG. 9 simply maps read requests that would normally go to a network adapter to a read request for the system SCSI adapter. Similarly, the device driver maps write requests that would go to a network adapter to a write request for the system SCSI adapter. Some small amount of data reformatting takes place to account for the differences in the format of the data presented by and presented to the network stack and what must be presented to and presented by the SCSI interface. It should be noted that in either case (and the case of initialization) the process is completely synchronous.

Likewise, the device driver 60, seen in FIGS. 10A and 10B, maps read requests that would normally go to a network adapter to a read request for the PCT adapter board. Unlike in the previous device driver of FIG. 9, this data has already been saved on the board by the interrupt handler and thus is returned immediately to the stack. Write requests cause data to be saved and the board to notify the host that data is pending; when the host calls to read the data the adapter moves data out from the board to the channel.

In both cases of FIG. 9 and FIGS. 10A and 10B, the flow charts have been simplified to show the major operational steps: the drivers both provided for handling error conditions as they occur on the respective devices. Further, the exact nature of the drivers vary subtly from each other depending on which operating system they are written for.

It will be understood that in the flow diagrams, FIGS. 6–10, which depict the operational steps controlled by software, only the significant steps have been specifically labeled, since the other steps will be self-evident to those skilled in the art.

Figure 5A:
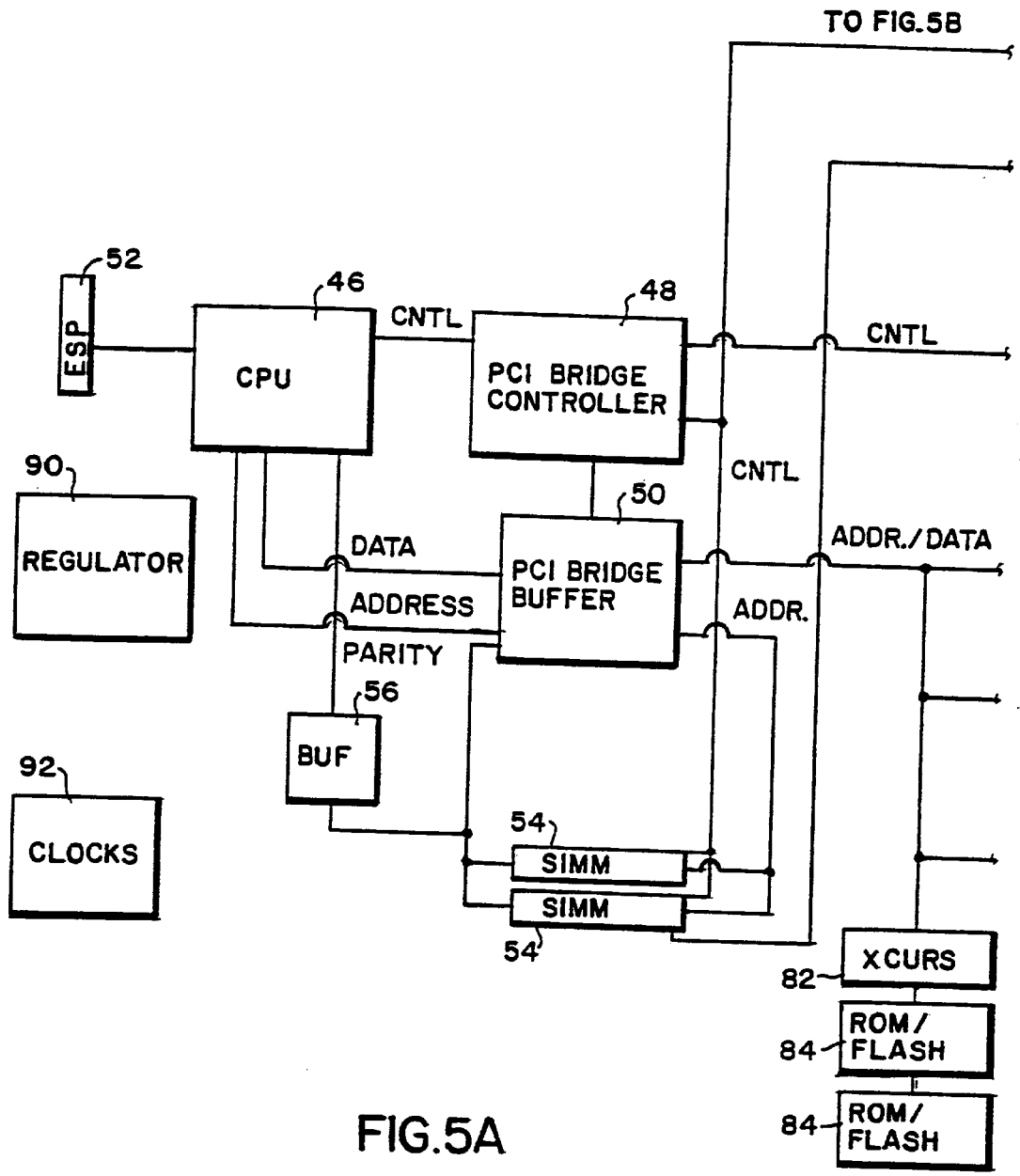
FIG. 5 is a schematic diagram of the hardware converter adapter board of FIG. 3; being subdivided into FIGS. 5A and 5B.
Figure 5B:
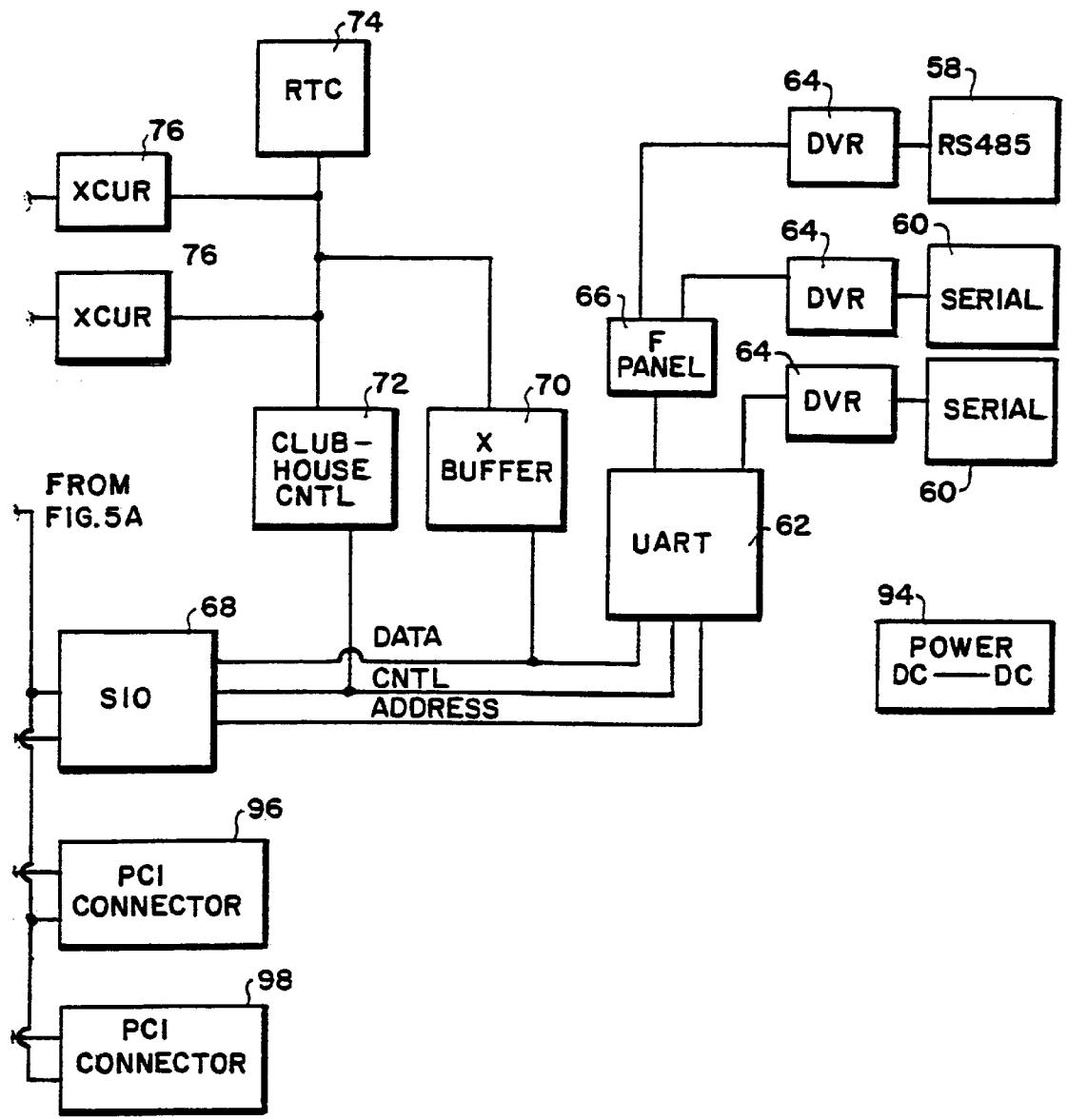
Figure 6:
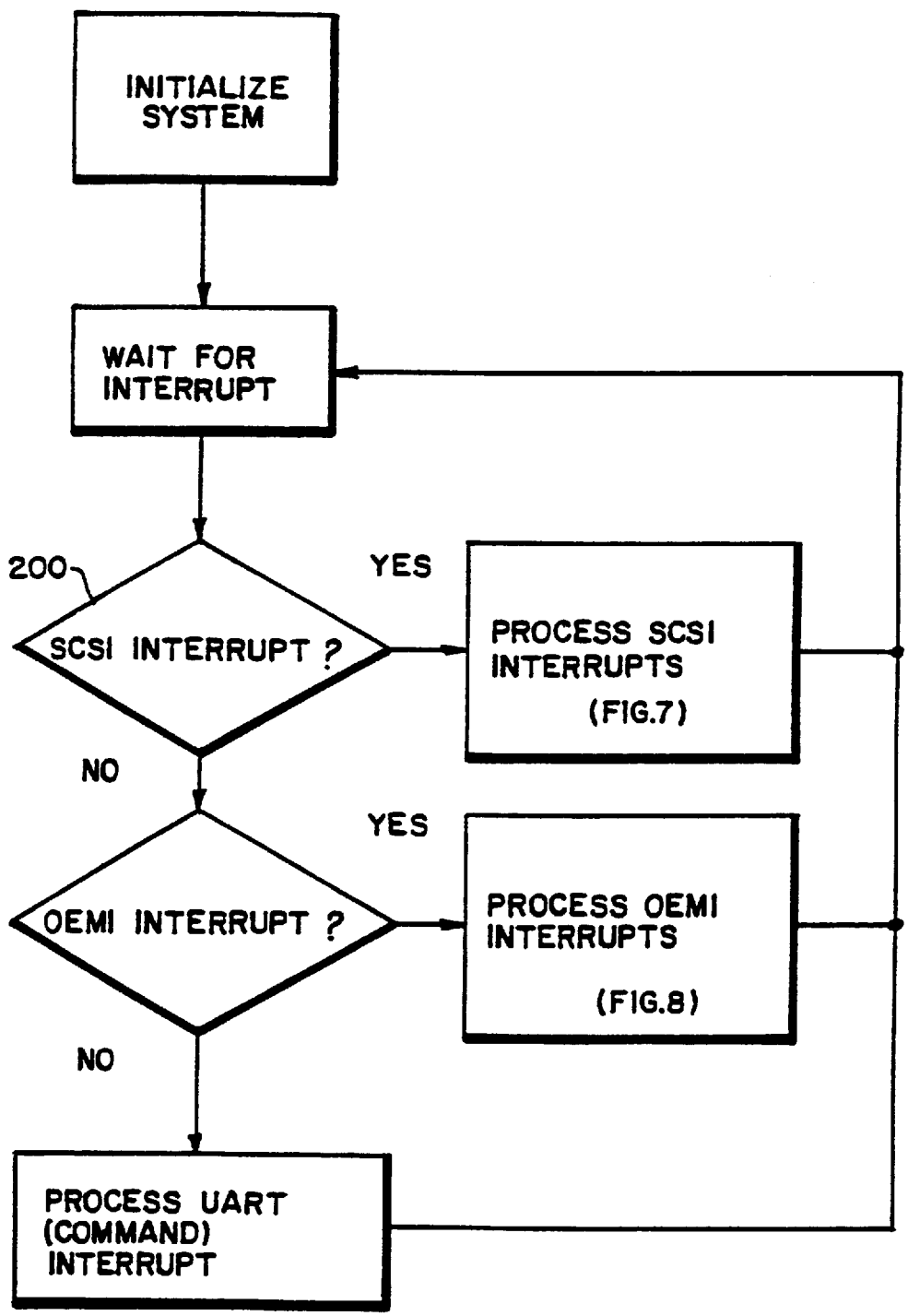
FIG. 6 is a flow chart or diagram which illustrates the high level program means and the basic operational steps directed by or resulting from such program means.
Figure 7:
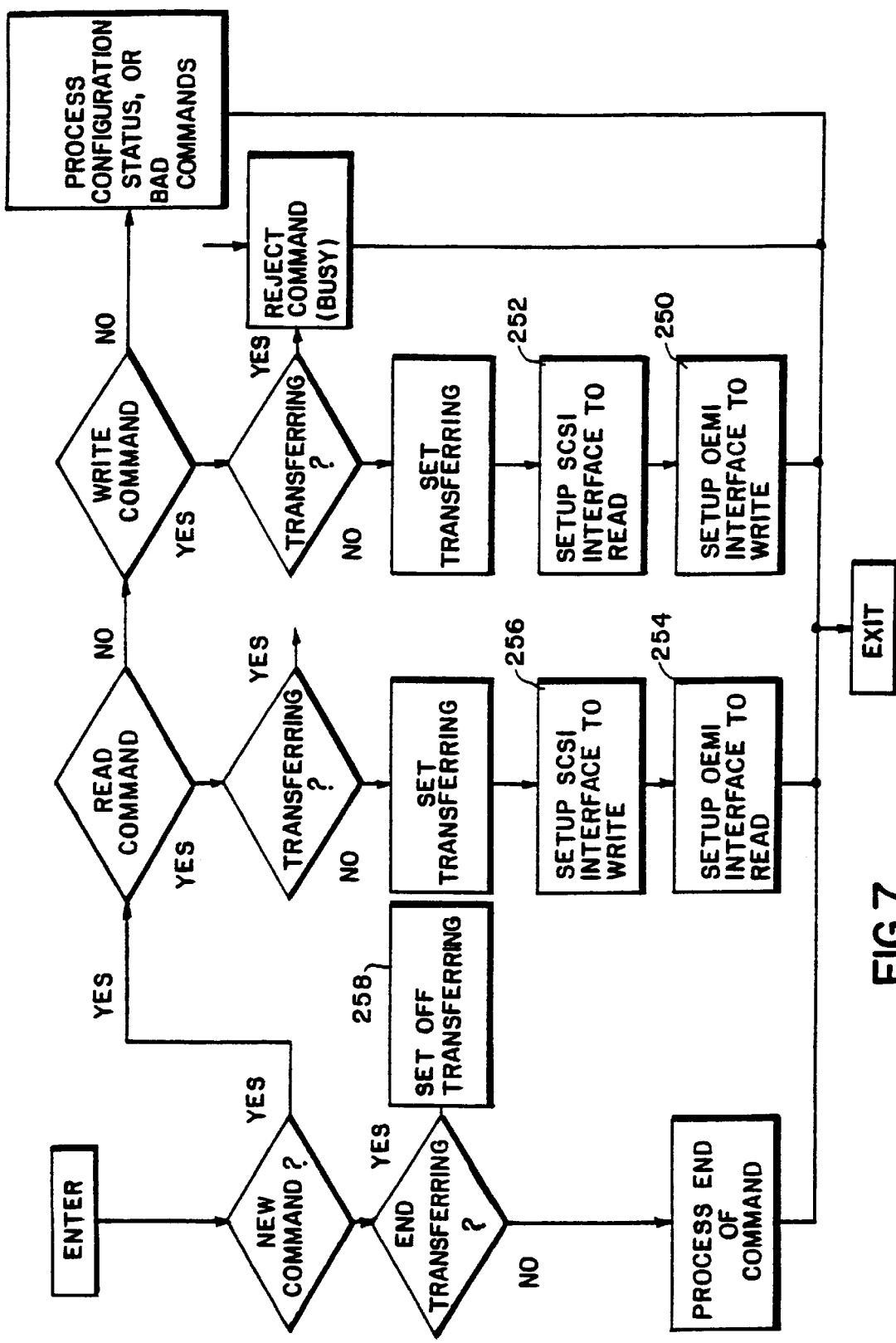
FIG. 7 is a flow chart or diagram which illustrates the specific steps involved in the processing or handling of SCS interrupts, previously shown broadly in FIG. 6.
Figure 8:
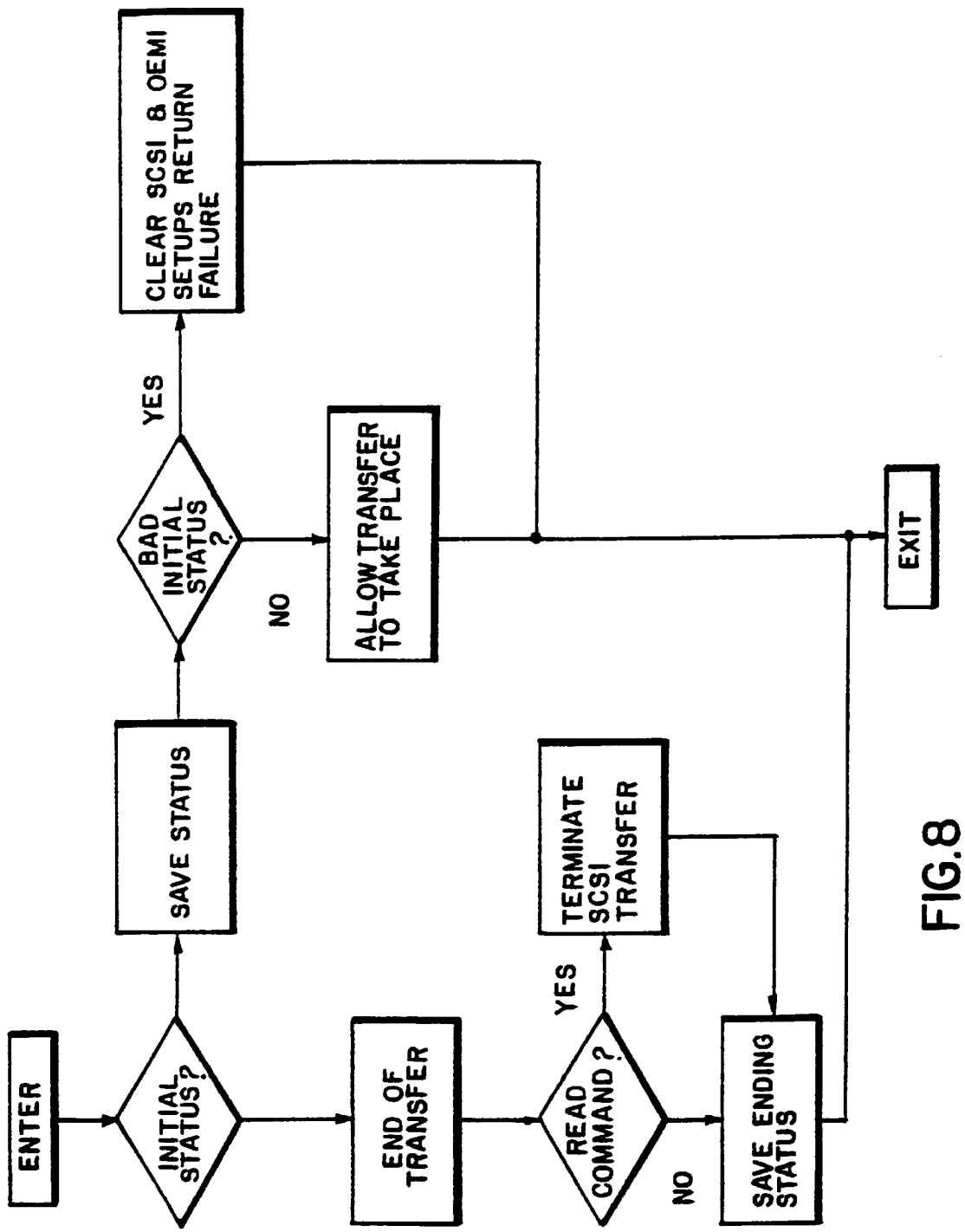
FIG. 8 is a flow chart or diagram which illustrates the specific steps involved in the processing or handling of alternative, i.e., OEMI, interrupts, previous shown broadly in FIG. 6.

Referring to FIG. 5, there is provided the hardware configuration of the second preferred embodiment shown in FIG. 3; in particular, a FIG. 5 is a schematic diagram of the hardware converter adapter board 42 shown in block form in FIG. 3. This configuration for the second preferred embodiment is similar to that of the first preferred embodiment in which the primary difference is that right-angle PCI connectors 96, 98 are used instead of the SCSI circuit 78, OEMI circuit 80 and external connectors 86, 88. In addition, the second preferred embodiment includes an extra ROM/flash circuit 84.

The present invention having been thus described with particular reference to the preferred forms thereof, it will be obvious that various changes and modifications may be made therein without departing from the spirit and scope of the invention as defined in the appended claims.

What is claimed is:

1. A system comprising:

least one first mainframe computer being IBM-plug-compatible;

at least one second computer being non-IBM-plug-compatible, a channel-to-channel adapter using a channel-to-channel protocol and directly coupled to said first mainframe computer;

a converter coupled through a first interface to said second computer and through a second interface to said channel-to-channel adapter, said converter and said channel-to-channel adapter being coupled between said first mainframe computer and said second computer;

said second computer including a device driver for converting commands running on said second computer to commands compatible with said first interface, said converter restructuring the commands compatible with said first interface into one of ESCON and bus-and-tag channel commands for said channel-to-channel adapter and said first mainframe computer, thereby:

causing said second computer to appear as an IBM-plug-compatible mainframe computer to said channel-to-channel adapter and to said first mainframe computer, causing said first mainframe computer to appear as an IBM plug-compatible mainframe computer to said second computer, and allowing both said first mainframe computer and said second computer to communicate with each other as peers through said channel-to-channel adapter using said channel-to-channel protocol; and wherein said channel-to-channel adapter and said converter place said first mainframe computer and said second computer in a symmetric peer-to-peer relationship.

2. The system of claim 1, further comprising a second in a frame computer being IBM-plug-compatible and an additional computer being non-IBM-plug-compatible, wherein said first and said second IBM mainframe computer can communicate, and wherein said second computer and said additional computer can communicate.

3. A system comprising:

at least one first mainframe computer being IBM-plug-compatible;

at least one second computer being non-IBM-plug-compatible, a channel-to-channel adapter using a channel-to-channel protocol and directly coupled to said first mainframe computer;

a converter coupled through a first interface to said first computer and through a second interface to said channel-to-channel adapter, said converter and said channel-to-channel adapter being coupled between said first mainframe computer and said second computer, said converter including means for processing interrupts from said first interface, said interrupt processing means including:

means for determining whether said converter is currently transferring data between said first interface and said second interface, and if said converter is not currently transferring data for producing a set-transferring command; and means responsive to said set-transferring command for determining whether a command is a read or a write command, and if the command is a read command, for setting up said first interface to write and setting up said second interface to read; and if said command is a write command, for setting up said first interface to read and setting up said second interface to write;

said second computer including a device driver for converting commands running on said second computer to commands compatible with said first interface, said converter restructuring the commands compatible with said first interface into one of ESCON and bus-and-tag channel commands for said channel-to-channel adapter and said first mainframe computer, thereby:

causing said second computer to appear as an IBM-plug-compatible mainframe computer to said channel-to-channel adapter and to said first mainframe computer, causing said first mainframe computer to appear as an IBM plug-compatible mainframe computer to said second computer, and allowing both said first mainframe computer and said second computer to communicate with each other as peers through said channel-to-channel adapter using said channel-to-channel protocol; and wherein said channel-to-channel adapter and said converter place said first mainframe computer and said second computer in a symmetric peer-to-peer relationship.

4. A system comprising:

at least one first mainframe computer being IBM-plug-compatible;

at least one second computer being non-IBM-plug-compatible, a channel-to-channel adapter using a channel-to-channel protocol and directly coupled to said first mainframe computer;

a converter coupled through a first interface to said first computer and through a second interface to said channel-to-channel adapter, said converter and said channel-to-channel adapter being coupled between said first mainframe computer and said second computer, said converter including means for processing interrupts from said second interface, said processing means including:

means for determining whether a command corresponding to an interrupt involving said second interface is an initial status command, for asserting an initial-status signal if the command is an initial status command, and for asserting a non-initial-status signal if the command is not an initial status command;

means, responsive to said initial-status signal, for saving status;

means, responsive to said initial-stats signal, for determining whether the initial status command is bad, for asserting a bad-initial-status signal if the initial status command is bad, and for asserting a good-initial-status signal if the initial status command is good;

means, responsive to said bad-initial-status signal, for clearing setups of the first and second interfaces and returning a signal representing failure;

means, responsive to said good-initial-status signal, for allowing a transfer to take place;

means, responsive to said not-initial-status signal, for determining whether the command is a read command, for asserting a read-command signal if the command is a read command, and for asserting a write-command signal if the command is not a read command;

means, responsive to said read-command signal, for terminating a transfer through said first interface; and means, responsive to said write-command signal, for saving ending status;

said second computer including a device driver for converting commands running on said second computer to commands compatible with said first interface, said converter restructuring the commands compatible with said first interface into one of ESCON and bus-and-tag channel commands for said channel-to-channel adapter and said first mainframe computer, thereby:

causing said second computer to appear as an IBM-plug-compatible mainframe computer to said channel-to-channel adapter and to said first mainframe computer, causing said first mainframe computer to appear as an IBM plug-compatible mainframe computer to said second computer, and allowing both said first mainframe computer and said second computer to communicate with each other as peers through said channel-to-channel adapter using said channel-to-channel protocol; and wherein said channel-to-channel adapter and said converter place said first mainframe computer and said second computer in a symmetric peer-to-peer relationship.

5. A method for establishing a symmetric peer-to-peer relationship between at least one first mainframe computer being IBM-Plug-Compatible and at least one second computer being non IBM-Plug-Compatible in which a channel-to channel adapter using a channel-to-channel protocol is coupled to the first mainframe computer, the method comprising the steps of (a) coupling a converter between the channel-to-channel adapter and the second computer, the converter having a first interface coupled to the second computer and a second interface coupled to the channel-to-channel adapter, the converter exchanging data using the channel-to-channel protocol coupled through the first interface;

(b) converting commands by a device driver running on the second computer to commands compatible with the first interface for transmitting to the converter through the first interface;

(c) transmitting the converted commands from the second computer to the converter through the first interface;

(d) restructuring the commands transmitted from the second computer to the converter into one of ESCON and bus-and-tag channel commands for the transmitting through the second interface to the channel-to-channel adapter and the first mainframe computer thereby;

causing the second computer to appear as an IBM-Plug-Compatible Mainframe Computer to the channel-to-channel adapter and to the first mainframe computer;

causing the first mainframe computer to appear as an IBM-Plug-Compatible Mainframe Computer to the second computer;

(e) allowing both the first main frame computer and the second computer to communicate with each other as peers through the channel-to-channel adapter using the channel-to-channel protocol.

6. The method of claim 5 wherein step (c) includes:

determining whether data is currently being transferred between the second computer and the channel-to-channel adapter, and if data is not currently being transferred, producing a set-transferring command, if a set-transferring command is produced, determining whether a command is a read or a write command, and if the command is a read command, setting-up the first interface to write and setting-up the second interface to read, and if the command is a write command, setting-up the first interface to read and setting-up the second interface to write.

7. The method of claim 5 wherein step (c) includes:

determining whether a command is an initial status command, and if the command is an initial status command, then:

saving status;
    determining whether the initial status is bad, and if the initial status is bad, then:
        clearing setups of the first and second interfaces; and returning failure;
    if the initial status is not bad, then allowing a transfer to take place;

if the command is not an initial status command, then:
    determining whether a command is a read command, and if the command is a read command, then terminating a transfer through the first interface;
    if the command is not a read command, then saving ending status.

* * * * *

UNITED STATES PATENT AND TRADE MARK OFFICE
CERTIFICATE OF CORRECTION

PATENT NO.   : 5,867,648
DATED        : February 2, 1999
INVENTOR(S)  : Thomas J. Foth It is certified that error appears in the above-identified patent and that said Letters Patent is hereby corrected as shown below:

Column 8, line 42, before "least" insert --at--.

Column 9, line 9, after "second" insert --mainframe-- and delete "in a frame".

Column 10, line 25, "stats" should be --status--.

Signed and Sealed this

Thirteenth Day of July, 1999

Attest:

Attesting Officer

Q. TODD DICKINSON

Acting Commissioner of Patents and Trademarks